Figure 1:
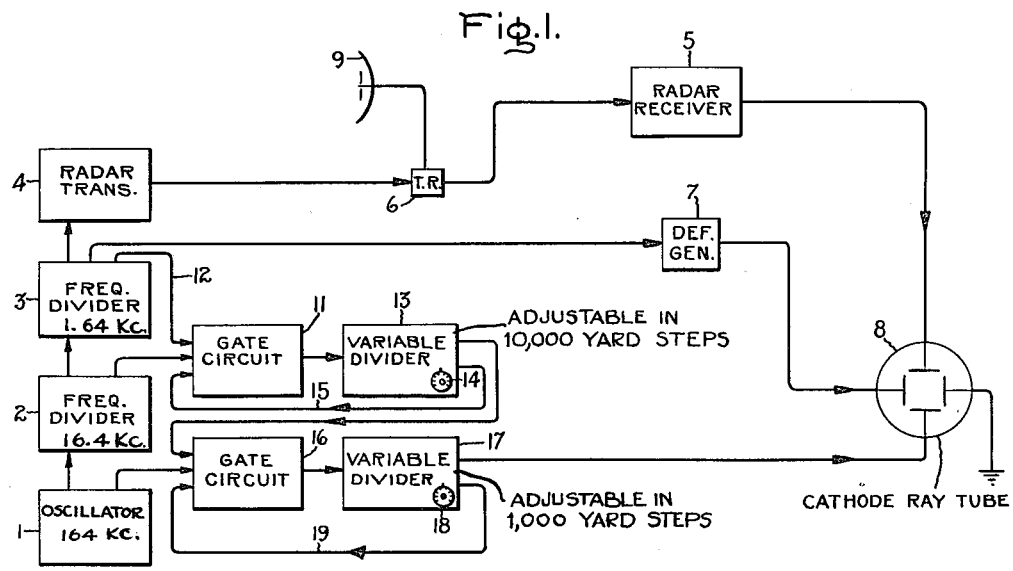

Nov. 11, 1952  J. C. COYKENDALL  2,617,984
TIME INTERVAL MEASURING SYSTEM
Filed Jan. 30, 1948  2 SHEETS—SHEET 1

Inventor:
John C. Coykendall,
by Merton D Morse
His Attorney.

Nov. 11, 1952 — J. C. COYKENDALL — 2,617,984
TIME INTERVAL MEASURING SYSTEM
Filed Jan. 30, 1948 — 2 SHEETS—SHEET 2

Inventor:
John C. Coykendall,
by Milton D. Morse
His Attorney.

Patented Nov. 11, 1952

2,617,984

UNITED STATES PATENT OFFICE 2,617,984

TIME INTERVAL MEASURING SYSTEM

John C. Coykendall, Milford, Conn., assignor to General Electric Company, a corporation of New York Application January 30, 1948, Serial No. 5,412

7 Claims. (Cl. 343—13)

This invention relates to systems for measuring recurring time intervals of short duration, and has particular application as a range indicator in reflected wave radio directive systems, and the like.

It is an object of this invention to provide a system which produces a train of control pulses recurring, at a predetermined rate, and, in addition, a train of marker pulses adjustably delayed with respect to the control pulses in a time not exceeding the period of the control pulses.

It is a further object of this invention to provide adjusting means in the proposed system for time delaying the marker pulses in coarse and fine steps with respect to the control pulses.

Yet another object of this invention is to provide calibrations on the above-mentioned adjusting means to indicate the time delay between the control pulses and the marker pulses.

It is contemplated to utilize the present invention as a range indicator in a reflected wave radio directive or radar system and subsequent description is directed to such applications. It is to be understood, however, that the invention is not limited to range indicator systems and may be utilized whenever it is desired to measure or control time intervals.

In the usual reflected wave radio directive or radar systems, a pulse generator actuates a high frequency transmitter which in turn radiates a pulse of high frequency energy. The pulse generator simultaneously initiates a sweep generator which in turn applies a deflection potential to the horizontal deflection circuit of a cathode-ray tube associated with a high frequency receiver. Therefore, synchronously with the radiation of the high frequency pulse into space the beam of the receiver cathode-ray indicator tube begins its sweep across the screen of this tube.

Any object encountered by the radiated pulse causes this pulse to be reflected and the reflected pulse is intercepted by the receiver, amplified, and applied to the vertical deflection circuit of the cathode-ray indicator tube. An indication of the reflected pulse, displaced a certain horizontal distance from a vertical reference line, may be obtained on the screen of the cathode-ray indicating tube. The distance of the image of the reflected pulse from the above-mentioned reference line on the cathode ray tube screen is a function of the distance to the reflecting object and also of the sweep speed of the horizontal deflection generator.

The distance to the reflecting object may be determined by causing the aforementioned pulse generator to initiate a variable delay range indicator circuit simultaneously with the actuation of the transmitter and sweep generator. A marker pulse may be obtained from the range indicator circuit and also applied to the vertical deflection circuit of the cathode-ray tube. This marker pulse may be adjustably time-delayed in incremental steps, and may, therefore, be given a desired horizontal position on the cathode-ray screen. When it is desired to obtain an indication of the distance to a reflecting object, the marker pulse is adjusted until it is aligned as closely as possible with the reflected pulse of this object. The adjusting means of the range indicator may be calibrated to indicate directly the distance to the reflecting object which has caused the particular reflected pulse on the cathode-ray screen to which the marker pulse has been aligned.

Figure 2:
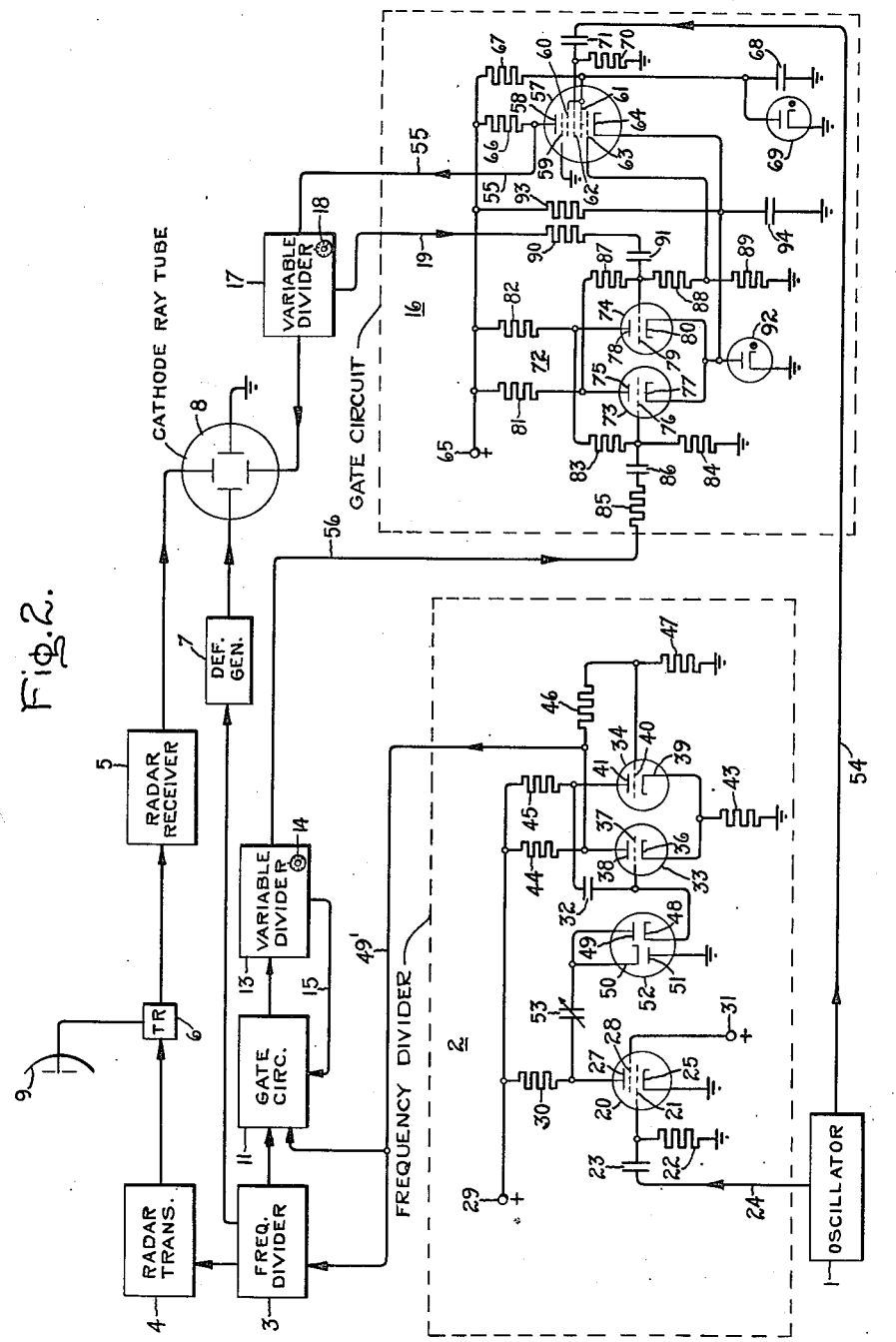

The features of this invention which are believed to be new are set forth with particularity in the appended claims. The invention itself, however, together with further objects and advantages thereof may best be understood by reference to the accompanying drawings wherein Fig. 1 shows in block form a radar system incorporating a range indicator system in accordance with the present invention. Fig. 2 is a representation partly schematic, showing the system of Fig. 1 in greater detail.

As previously mentioned Fig. 1 shows a range indicator circuit embodying the present invention as applied, for example, to a usual radar circuit. It is to be clearly understood, however, that although the invention is described in conjunction with a radar system the device is not limited thereto, as it may be utilized in any system in which it is desired to measure time intervals accurately.

In the system to be described it is contemplated, for example, to produce a marker pulse variably in position through such a time interval which would correspond to the distance to a reflecting object of 0–99,000 yards in steps of 1,000 yards. These values and subsequent values are used for convenience of description only, and are not to be construed as a limiting feature.

Referring now to Fig. 1, a continuously running fixed frequency oscillator is represented as 1. This oscillator is preferably crystal controlled and may have a frequency of 164 kc./sec. The output of oscillator 1 may have the usual sine waveform or may be of the pulse form. A first frequency divider is represented as 2, and this divider is of the fixed type. Frequency divider 2 produces 16.4 kc./sec. pulses at its output in response to the 164 kc./sec. signals from oscillator 1. A second frequency divider is represented as 3, and this divider is also of the fixed type, and produces 1.64 kc./sec. pulses in response to the 16.4 kc./sec. pulses from divider 2.

The 1.64 kc./sec. pulses from frequency divider 3 are used to key the radar transmitter 4, and to actuate a deflection generator 7, thus initiating the horizontal sweep circuit of the cathode-ray indicating tube 8.

The system thus far described is similar to the conventional radar system. In response to pulses received from frequency divider 3, transmitter 4 applies high frequency pulses of energy to antenna 9, through the usual T-R box 6. Simultaneously with these radiated pulses, the beam of the cathode-ray tube 8 commences its sweep across the screen of this tube. Any reflected pulses due to objects reflecting the pulses radiated from antenna 9, are intercepted by the receiver 5 and applied to the vertical deflection circuit of the ray tube 8. Vertical pulses thus appear on the beam trace across this screen of the cathode-ray tube, and the horizontal distance of each of these pulses from a vertical reference is a measure of the distance to the respective reflecting objects.

In accordance with the present invention, an adjustable marker pulse is provided on the screen of the cathode-ray tube, and by manipulating various calibrated control dials, this marker pulse may be aligned with any desired reflected pulse appearing on the cathode-ray screen. For convenience, the control dials may be calibrated directly in terms of reflecting object distances.

The fixed frequency divider 3 has a further function, that of opening a gate circuit 11 by way of lead 12. The frequency divider 3 generates pulses at the rate of 1.64 kc./sec., and hence opens gate circuit 11 approximately every 610 microseconds. When gate circuit 11 is open, pulses at the rate of 16.4 kc./sec. may be applied to a variable frequency divider 13, or step counter, from the fixed divider 2 through this gate circuit. Variable divider 13 may be adjusted by dial 14 to produce an output pulse after a definite time delay which is adjustable in equal incremental steps. That is for each adjustment of control 14, a certain number of pulses from frequency divider 2 are necessary for each output pulse produced by variable frequency divider 13. Control dial 14 may be calibrated into a number of steps, each step representing a time interval equivalent, for example, to reflecting object distances of steps of 10,000 yards. The greatest delay of divider 13 is somewhat less than 610 microseconds as this represents the time required to sweep the cathode-ray beam across the entire screen and hence the maximum range of the system. Each output pulse from variable frequency divider 13 closes the gate circuit 11 by way of lead 15, and this gate circuit remains closed until again opened by the next pulse from frequency divider 3. The output pulse of variable divider 13 also opens a gate circuit 16, and gate circuit 16, is, therefore, opened a predetermined time interval after the initiation of transmitter 4 by frequency divider 3. This time interval is adjustable by control dial 14 and this control dial is calibrated to read directly distances at steps of 10,000 yards.

When gate circuit 16 is open signals from oscillator 1 are applied to another variable frequency divider, or step counter, 17, at the rate of 164 kc./sec. and by means of a control dial 18 an incremental time delay may be introduced for each setting of the control dial 18 so that frequency divider 17 produces an output pulse for a certain selected number of cycles of oscillations applied thereto by oscillator 1 through gate circuit 16. The control dial 18 may be calibrated to read distances directly in steps of 1,000 yards. The output pulses produced by variable frequency divider 17 are applied to the vertical deflecting circuit of the cathode-ray indicator tube 8. The output pulses of divider 17 are also used to close the gate circuit 16 by way of lead 19, and each time this gate circuit is closed in response to a pulse from divider 17 it remains closed until reopened by the next pulse from divider 13.

It is apparent that by increasing the number of fixed frequency divider circuits, gate circuits and variable dividers, the time interval control steps may be made as fine as desired. For example, a third set of components would make an adjustment in 100 yard steps possible, provided that an oscillator frequency of 1640 kc./sec. were used.

It can be seen that for each setting of control dials 14 and 18 a marker pulse appears on the screen of the indicator tube 8, and this marker is displaced along the horizontal axis of the screen a certain distance dependent upon the setting of these dials. By manipulating the dials for coarse and fine adjustment this marker pulse may be aligned, within the limits of the finest range subdivision, with a reflected pulse on the screen. The distance to the reflecting object corresponding to the selected reflected pulse may then be read directly from the calibrations on dials 14 and 18 to within 1,000 yards. A closer reading may be obtained when provisions is made for finer control, as previously disclosed.

Fig. 2 shows the above-described circuit in greater detail, and in this figure components similar to those of Fig. 1 are designated by like numerals. Specific forms of the fixed frequency divider 2 and the gate circuit 16 are shown schematically in Fig. 2 so that a more detailed description may be given of circuits that may be utilized in these components.

Referring now to Fig. 2, signals from oscillator 1 are impressed upon a fixed frequency divider represented generally as 2. This frequency divider may be similar to that disclosed in my United States Letters Patent No. 2,416,158 granted February 18, 1947, and comprises an electron discharge device 20 having a control electrode 21 coupled through a resistor 22 and capacitor 23 to oscillator 1 by way of lead 24. Device 20 includes a cathode 25, an anode 27 and screen electrode 28. The anode 27 is connected to a positive source of unidirectional potential indicated at 29 through an anode resistor 30 and screen 28 is connected to a positive source of screen potential indicated at 31.

The division of frequency is obtained by charging and discharging a capacitor 32, once for each successive groups of signals comprising a predetermined number of signals impressed on the control electrode 21 from oscillator 1. The circuit for discharging capacitor 32 comprises a modified multivibrator including discharge devices 33 and 34. Device 33 includes a cathode 36, a control electrode 37 and an anode 38, and device 34 includes a cathode 39, a control electrode 40 and an anode 41. The cathodes 36 and 39 are connected together and to ground through a common resistor 43. The anodes 38 and 41 are connected to the positive potential source 29 through resistors 44 and 45 respectively. Anode 38 of device 33 is coupled to control electrode 40 of device 34 through a resistor 46, and the control electrode 40 is in turn connected to ground through a resistor 47. The anode 41 of device 34 is coupled to the control electrode 37 of device 33 by means of the capacitor 32.

For negative potentials, the control electrode 37 is connected to ground through the cathode 48, anode 49, cathode 50 and anode 51 of device 52 of the double diode type of electron discharge device. It is evident, therefore, that the control electrode 37 cannot be driven negative with respect to ground. This control electrode is therefore normally at ground potential or at some slightly positive potential which is insufficient to overcome the bias on device 33, due to the potential drop across cathode resistor 43, produced by the current flow in device 34 which draws both anode and control electrode current. It can therefore be seen that device 33 is normally non-conductive and device 34 is normally conductive.

Capacitor 32 is coupled to anode 27 of discharge device 20 through a variable capacitor 53 and device 52, as shown. Whenever the control electrode 21 of device 20 is driven negative due to the signals from oscillator 1, a positive pulse appears at the anode 27 and capacitors 53 and 32 are charged in series, due to the potential difference between anode 27 and anode 41 of device 34, during the time interval of the positive pulse at anode 27. At the end of the above-mentioned time interval, capacitor 53 discharges through the left-hand section of device 52, the capacitor 32, however, retaining its charge as the right-hand section of device 52 is non-conducting in the direction of discharge of this capacitor. It is evident that successive positive pulses, produced by device 20, charge capacitors 53 and 32 in series, and the charge on capacitor 32 becomes greater with each additional positive pulse. When a predetermined charge has accumulated on capacitor 32, control electrode 37 becomes sufficiently positive to overcome the bias due to resistor 43. This initiates the well known multivibrator action and by cumulative action device 33 becomes highly conductive and device 34 becomes non-conductive. Capacitor 32 then discharges after a predetermined time interval, the multivibrator circuit rapidly returns to its normal state. This action gives rise to a negative pulse on the anode 38 of device 33.

The negative pulses appearing on anode 38 appear once in each group of signals applied to the frequency divider 2 by oscillator 1, and a frequency division is therefore effected. The negative pulses appearing on anode 38 are applied to frequency divider 3 and gate circuit 11 by way of lead 49' to actuate these circuits in the manner previously described.

As previously pointed out in connection with Fig. 1, signals produced by oscillator 1 are impressed on frequency divider 17 through a gate circuit 16. As shown in Fig. 2, signals from oscillator 1 are applied to gate circuit 16 by way of lead 54 and thence to frequency divider 17 by way of lead 55. The gate circuit 16 is opened by pulses from the variable frequency divider 13 by way of lead 56 and closed by the output pulses of frequency divider 17 by way of lead 19.

The gate circuit 16 comprises an electron discharge device 57 which includes an anode 58, a suppressor electrode 59, screen electrodes 60 and 61, control electrodes 62 and 63, and a cathode 64. Anode 58 is connected to a source of unidirectional potential indicated at 65 through a resistor 66. Suppressor electrode 59 is connected to ground. Screen electrodes 60 and 61 are connected together and to the source 65 through a resistor 67, and these electrodes are coupled to ground through a capacitor 68 shunted by a gaseous regulator device 69. The capacitor 68 and regulator device 69 are used to maintain a constant potential difference between the screen electrodes 60, 61 and the cathode 64. Control electrode 63 is connected to a multivibrator circuit 72 to be described, by means of which this electrode may have two potential values, one sufficiently negative to bias device 57 well beyond cutoff so that signals applied to control electrode 62 are not translated by device 57, and the other such that signals applied to control electrode 62 are translated by device 57. Control electrode 62 is connected to ground by grid leak resistor 70 and signals from oscillator 1 are applied to this control electrode through capacitor 71.

It can be seen that for one value of bias potential on control electrode 63, signals from oscillator 1 applied to control electrode 62 are translated by device 57 and signals may be obtained from the anode 58 and applied to the frequency divider circuit 17, by way of lead 55, as shown. For the other value of bias potential on control electrode 63, signals on control electrode 62 have no effect on the output of device 57. The bias on control electrode 63 is shifted from one of these values to the other by the multivibrator circuit shown generally at 72. Multivibrator 72 is so arranged that in response to a negative control pulse from the frequency divider 13 by way of lead 56, the bias of electrode 63 is such that the divider translates signals therethrough. This translation continues until a further negative control pulse, received from the frequency divider 17 by way of lead 19, returns the multivibrator 72 to its original state and the device 57 again becomes non-conductive.

Multivibrator 72 comprises a pair of electron discharge devices 73 and 74. Device 73 includes an anode 75, a control electrode 76 and a cathode 77, and device 74 includes an anode 78, a control electrode 79 and a cathode 80. Anodes 75 and 78 are connected to source 65 through resistors 81 and 82 respectively. Anode 78 is further connected to control electrode 76 through a resistor 83, and control electrode 76 is connected to ground through a resistor 84. Negative control pulses from the variable frequency divider 13 are applied to control electrode 76 through resistor 85 and capacitor 86. Anode 75 is connected to control electrode 79 through a resistor 87, and control electrode 79 is connected to ground through resistors 88 and 89 as shown. Negative control pulses are applied to control electrode 79 from frequency divider 17 by way of lead 19 and through resistor 90 and capacitor 91. Cathodes 77 and 80 and cathode 64 of device 57 are connected together and to ground through a gaseous regulator discharge device 92. Device 92 is maintained conductive by means of a positive potential applied to the anode thereof, through resistor 93 from source 65. Capacitor 94 may be connected across device 92 to reduce the degeneration in the cathode circuits of the electron discharge devices.

It is well known in the operation of the multivibrator 72 that under static conditions either device 73 is highly conductive and device 74 is non-conductive or vice versa. Assuming that device 73 is conductive and device 74 is non-conductive, the potential across resistor 89 could be made such that control electrode 63 would bias device 57 well beyond cutoff and this device would be unresponsive to signals on the control electrode 62. However, in receipt of a negative pulse from the frequency divider 13 the circuit 72 is actuated to its other state in the well known way, and device 74 becomes conductive and device 73 nonconductive. In this state, the potential of the anode 75 rises and also the potential across resistor 89. Thus the potential on control electrode 63 of device 57 may be raised to a point that device 57 is responsive to signals on control electrode 62. The device 57 remains operative until a further control pulse from the frequency divider 17, by way of lead 19, returns multivibrator 72 to its initial state.

As previously described, the output signals of gate circuit 16 are applied to the variable frequency divider circuit 17 by way of lead 55.

The variable frequency divider 17 may be similar in many respects to the fixed frequency divider 2. The frequency count may be varied in the variable divider 17 by charging a capacitor such as capacitor 53 of divider 2. This could best be accomplished by providing a rotary switch which would connect a different capacitor into the circuit for each count, the rotary switch being controlled by the calibrated dial 18.

The fixed frequency divider 3 may be substantially similar to divider 2, gate circuit 11 may be similar to gate circuit 16, and variable divider 13 may be similar to divider 17. Further discussion of these components is therefore believed to be unnecessary.

I have therefore provided a device for use in radar systems and the like, by means of which time intervals may be accurately measured or controlled.

While a certain specific embodiment has been shown and described, it will, of course, be understood that various modifications may be made without departing from the invention. The appended claims are therefore appended to cover any such modifications as fall within the true spirit and scope of the invention.

What I claim as new and desire to secure by Letters Patent of the United States is:

1. In a time interval indicating system, a source of oscillations, frequency dividing means coupled to said source, means for deriving a recurring control pulse from said frequency dividing means synchronized with said oscillations and recurring at a submultiple frequency, and means for obtaining a recurring marker pulse adjustably time delayed with respect to said control pulse from said system, said last-mentioned means comprising a normally-nonconductive gate device connected to said frequency dividing means and arranged to be rendered conductive upon occurrence of said control pulse, a variable frequency divider means arranged to produce a single marker pulse in response to a predetermined, selectable number of cycles of said oscillations supplied to its input, means including said gate device for coupling said variable frequency divider means to said source of oscillations while said gate device is conductive, means for restoring said gate device to nonconductive condition in response to said marker pulse, and calibrated adjustable means included in said variable frequency divider means for varying the time delay of said marker pulse with respect to said control pulse in incremental steps integrally related to the time period of said oscillations.

2. A range indicating system for reflected wave radio directive systems and the like, said radio directive system including a transmitter, a receiver and a cathode-ray indicating tube controlled by said receiver, and said range indicating system comprising in combination, a source of oscillations, fixed frequency divider means for deriving a recurring control pulse from said source synchronized with said oscillations and recurring at a submultiple frequency, means responsive to said control pulse for controlling the operation of said transmitter and a sweep circuit of said cathode-ray indicating tube, a variable frequency divider means arranged to produce a recurring marker pulse in response to a predetermined, selectable number of cycles of said oscillations supplied to its input, a normally-nonconductive gate device connected to said frequency dividing means and arranged to be rendered conductive upon occurrence of said control pulse, said variable frequency divider means being coupled to said source through said gate circuit means while said gate device is conductive, means for restoring said gate device to non-conductive condition in response to said marker pulse, and means for applying said marker pulse to said cathode-ray indicating tube.

3. A range indicating system for reflected wave radio directive systems and the like, said radio directive system including a transmitter, a receiver and a cathode-ray indicating tube controlled by said receiver, and said range indicating system comprising in combination, a source of oscillations, fixed frequency divider means for deriving a recurring control pulse from said source synchronized with said oscillations and recurring at a submultiple frequency, means responsive to said control pulse for controlling the operation of said transmitter and the sweep circuit of said indicating tube, a variable frequency divider means arranged to produce a recurring marker pulse in response to a predetermined, selectable number of cycles of said oscillations supplied to its input, a normally-nonconductive gate device connected to said frequency dividing means and arranged to be rendered conductive upon occurrence of said control pulse, said variable frequency divider means being coupled to said source through said gate device while said gate device is conductive, means for restoring said gate device to non-conductive condition in response to said marker pulse, means for applying said marker pulse to said cathode-ray indicator tube, and calibrated control means connected to said variable frequency divider means for adjusting the time delay between said control pulse and said marker pulse in incremental steps integrally related to the time period of said oscillations.

4. A time interval measuring system comprising in combination, a source of oscillations, a plurality of fixed frequency dividers coupled thereto in cascaded arrangement, means for deriving a recurring control pulse from the output of said cascaded fixed frequency dividers, and means for obtaining a recurring marker pulse adjustably time delayed with respect to said control pulse from said system, said-last-mentioned means comprising a plurality of stages each including mutually-coupled variable-frequency divider and gate circuit means, the gate circuit means included in the first of said stages being actuated by said control pulse, the gate circuit means included in each subsequent one of said stages being actuated by the respective variable frequency divider means included in the next preceding stage, means comprising the respective gate circuit means included in said stages for coupling the variable frequency divider means included therein to successive ones of said fixed frequency dividers, means including the gate circuit means included in the final stage for coupling the variable frequency divider means included therein to said source, and means for deriving said recurring marker pulse from said last-mentioned variable frequency divider means.

5. A distance indicating system comprising in combination, a source of oscillations, frequency dividing means coupled to said source for deriving a recurring control pulse from said source synchronized with said oscillations and recurring at a submultiple frequency, means for applying said control pulse to a radio directive transmitter to control the operation thereof, and means for applying said control pulse simultaneously to the deflection circuit of a cathode-ray indicating tube, means for obtaining a recurring marker pulse adjustably time delayed with respect to said control pulse from said system, said last-mentioned means comprising a normally-nonconductive gate device connected to said frequency dividing means and arranged to be rendered conductive upon occurrence of said control pulse, a variable frequency divider means arranged to produce a single marker pulse in response to a predetermined, selectable number of cycles of said oscillations supplied to its input, means including said gate device for coupling said variable frequency divider means to said source of oscillations while said gate device is conductive, means for restoring said gate device to nonconductive condition in response to each of said marker pulses, means for applying said marker pulses to said cathode-ray tube, and calibrated adjustable means included in said variable frequency divider means for varying the time interval between said control pulse and said marker pulse in incremental steps each equal to the time period of one cycle of said oscillations.

6. In a time interval indicating system, a source providing a first periodic electrical wave of a first frequency, frequency-dividing means for deriving from said source a second periodic wave of a second, submultiple frequency, a normally-nonconductive gate device connected to said source and arranged to be rendered conductive by said second wave during a predetermined time interval in each cycle thereof, an adjustable frequency-counting circuit adapted to produce a pulse in response to impression thereon of a pre-selectable number of cycles of said first wave, means for adjusting said counting circuit to respond to any number of said cycles less than the number occurring during one cycle of said second wave, means for impressing said first wave on said counting circuit through said gate device so long as said gate device is conductive, and means controlled by each said pulse for resetting said counting circuit and restoring said gate device to nonconductive condition.

7. A time interval measuring system comprising at least first, second and third synchronized sources of periodic electrical waves, said second and third sources each having a fundamental frequency which is an integral submultiple of the frequency of the preceding source, first and second, normally-nonconductive, gate devices having inputs respectively connected to said first and second sources and each arranged to supply the wave from its associated source to its output when conductive, first and second, adjustable, frequency-counting circuits respectively connected to said outputs and each arranged to produce a single control pulse in response to a predetermined number of cycles of the wave supplied from its associated gate device, means for switching said second gate device to conductive condition at a predetermined point of time in each cycle from said third source, means for switching said first gate device to conductive condition in response to occurrence of each pulse from said second counting circuit, means for supplying the pulses from said first counting circuit to a utilization circuit, and means for resetting each gate device to non-conductive condition in response to each pulse produced by its associated counting circuit.

JOHN C. COYKENDALL.

REFERENCES CITED

The following references are of record in the file of this patent:

UNITED STATES PATENTS

| Number | Name | Date |
|---|---|---|
| 2,403,873 | Mumma | July 9, 1946 |
| 2,403,918 | Grosdoff | July 16, 1946 |
| 2,404,047 | Flory et al. | July 16, 1946 |
| 2,405,238 | Seeley | Aug. 6, 1946 |
| 2,420,516 | Bischoff | May 13, 1947 |
| 2,425,600 | Coykendall | Aug. 12, 1947 |
| 2,454,782 | De Rosa | Nov. 30, 1948 |

FOREIGN PATENTS

| Number | Country | Date |
|---|---|---|
| 552,072 | Great Britain | Mar. 22, 1943 |